United States Patent
Sundararajan et al.

(10) Patent No.: US 12,095,652 B1
(45) Date of Patent: Sep. 17, 2024

(54) SERVICE ACCESS AWARENESS IN A DISTRIBUTED ARCHITECTURE

(71) Applicant: Cisco Technology, Inc., San Jose, CA (US)

(72) Inventors: Balaji Sundararajan, Fremont, CA (US); Satish Kumar Mahadevan, San Ramon, CA (US); Ramakumara Kariyappa, San Jose, CA (US); Ganesh Devendrachar, Milpitas, CA (US); Arul Murugan Manickam, San Jose, CA (US); Samir D Thoria, Saratoga, CA (US); Pritam Baruah, Fremont, CA (US); Deepa Rajendra Sangolli, San Jose, CA (US); Avinash Shah, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/328,566

(22) Filed: Jun. 2, 2023

(51) Int. Cl.
*H04L 45/17* (2022.01)
*H04L 43/0817* (2022.01)
*H04L 45/24* (2022.01)

(52) U.S. Cl.
CPC .......... *H04L 45/17* (2022.05); *H04L 43/0817* (2013.01); *H04L 45/24* (2013.01)

(58) Field of Classification Search
CPC ...... H04L 43/0817; H04L 45/24; H04L 45/17
USPC ....................................................... 709/238
See application file for complete search history.

(56) References Cited

U.S. PATENT DOCUMENTS

| | | | |
|---|---|---|---|
| 9,264,301 B1 | 2/2016 | Chua et al. | |
| 10,616,347 B1* | 4/2020 | Van Oort | H04L 47/20 |
| 2016/0210209 A1* | 7/2016 | Verkaik | G06F 11/2028 |
| 2019/0052520 A1* | 2/2019 | Luo | H04L 41/0816 |
| 2019/0104090 A1* | 4/2019 | Labonte | H04L 49/252 |
| 2020/0014615 A1* | 1/2020 | Michael | H04L 43/0864 |
| 2021/0399920 A1 | 12/2021 | Sundararajan et al. | |
| 2022/0263708 A1* | 8/2022 | Ramachandran | H04L 12/4641 |
| 2023/0336467 A1* | 10/2023 | Padebettu | H04L 61/5014 709/238 |

OTHER PUBLICATIONS

Akyildiz et al., "A roadmap for traffic engineering in SDN—OpenFlow networks," Computer Networks, Jun. 2014, 71:1-30.

* cited by examiner

*Primary Examiner* — Meng Vang
(74) *Attorney, Agent, or Firm* — Lee & Hayes, P.C.

(57) ABSTRACT

Techniques are described for suppressing data plane traffic using a service monitoring policy for data plane control. If a service provided to a router becomes nonfunctional, preventing the router from being able to forward traffic to a next-hop device, data plane traffic from client devices on the data plane that requires the use of the nonfunctioning service is suppressed. Additionally, new communication pathways to the router that will use the nonfunctioning service are prevented from being established. Traffic is redirected to another router with a functioning service. Thus, traffic that may normally be directed to the router with the nonfunctioning service and not able to be forwarded (e.g., black-holing of data) can be forwarded to the other router.

20 Claims, 5 Drawing Sheets

SERVICE ACCESS AWARENESS IN A DISTRIBUTED ARCHITECTURE

TECHNICAL FIELD

The present disclosure relates generally to communications of data through distributed application architectures using a service monitoring policy for data plane control.

BACKGROUND

Currently, a great majority of enterprises run applications in one or more cloud computing platforms in private networks, such as a virtual private cloud (VPC). These private networks are often on-demand and are readily reconfigurable to the needs of each enterprise that uses the VPC. The VPC for each enterprise is typically isolated from other VPCs from other enterprises, and in some instances, from within the same enterprises. Traffic flow within these networks is often controlled using Policy-based Routing (PBR). PBR generally refers to techniques and technology used to make routing decisions in a network. These routing decisions are often established by a network administrator and are used throughout the network. When a router in a network receives a packet of data, the destination address in the packet is used by the router to look up the receiving entity in a routing table. The PBR can include other routing directives, such as the use of the source address, a packet type, the size of the packet, and the like, to determine routing destinations.

On a network-wide scale, the PBR acts as an instruction manual for the routers in a network for the delivery of packets of data. In most instances, the use of a PBR works well in a network. However, these techniques and technology may inadvertently cause traffic black holes. For example, a PBR can depend on the receiving device being in a state capable of receiving the packet of data. The router transmitting the data, using the PBR, sends the packet to the receiving router (or other component) and then resets for transmitting another packet of data, perhaps to another router or component. If the receiving component, or a service provided by the receiving component, is not functioning, the packet of data may be transiently or permanently stored in the memory of the receiving component with no processing by the receiving component to move that packet of data to the next-hop destination, resulting in a black holing of data. Further, other packets of data may be received at the nonfunctioning router, resulting in a "buildup" of packets at the nonfunctioning router. Accordingly, the use of a network wide PBR may be limited in ensuring the timely and orderly transmission of packets of data in a network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
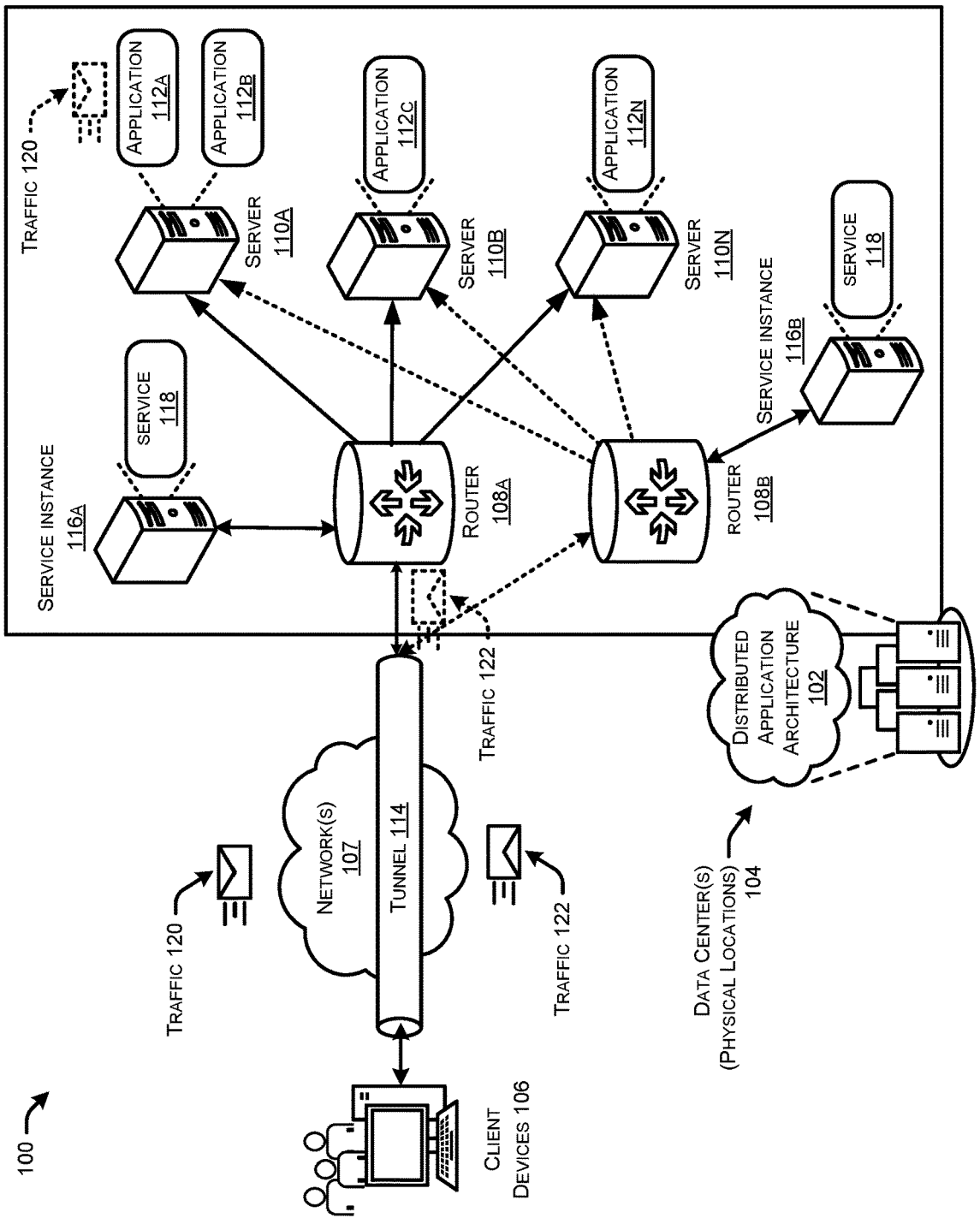
FIG. 1 illustrates a system-architecture diagram of an example distributed application architecture that suppresses data plane sessions to redirect traffic, in accordance with some examples of the presently disclosed subject matter.

This disclosure describes techniques for suppressing data plane sessions to redirect traffic where a router uses local policy-based routing to suppress traffic from the client device and redirect that traffic to another router.

A method to perform techniques described herein includes enabling Service-Monitoring-Policy-for-Data-Plane-Control (SMPDPC) on the router, wherein the SMPDPC comprises routing instructions specific to the router, enabling a router service provided by a service instance at the router, wherein the router service is used by the router prior to forwarding traffic to a next-hop service provided by a next-hop device, establishing bidirectional forwarding detection between the router to commence monitoring of a functionality of the router service by the router, enabling communications between the router and a client device on a data plane, wherein the data plane is for traffic received from the client device intended for the next-hop device, receiving an indication that the router service provided by the service instance is nonfunctional, and suppressing traffic received from the client device on the data plane for the traffic received from the client device intended for the next-hop device. Further, the method may include enabling a second router to provide the router service using a second service instance, and enabling communications between the second router and the client device on the data plane, wherein the data plane is for traffic received from the client device intended for the next-hop device. Still further, the method may include receiving an indication that the router service provided by the service instance is functional, reestablishing bidirectional forwarding detection between the router to commence monitoring of a functionality of the router service by the router, reenabling communications between the router and the client device on the data plane for traffic received from the client device intended for the next-hop device, and disabling communications between the second router and the client device on the data plane. The router service may include, but is not limited to, a firewall, data loss prevention services, compliance policy systems, load balancers, and intrusion prevention services. Still further, the method may include, upon receiving the indication that the router service provided by the service instance is nonfunctional, ceasing the establishment of a second tunnel between the client device and the router for traffic on the data plane for traffic received from the client device intended for the next-hop device. In some examples, suppressing traffic received from the client device on the data plane for the traffic received from the client device intended for the next-hop device further comprises withdrawing a transporter locator router to the router. Still additionally, the method may include maintaining a second data plane at the router for second traffic from the client device intended for a second service provided by the next-hop device or a second next-hop device.

Additionally, the techniques described herein may be performed by a system and/or device having non-transitory computer-readable media storing computer-executable instructions that, when executed by one or more processors, performs the method described above.

Example Embodiments

Cloud computing architectures and platforms have provided the means for application developers to provide distributed application services to many clients that scale on these cloud architectures. A distributed application service may be supported by networks of servers that are running various versions of the application to service requests from client devices at scale. Often, these cloud architectures are controlled using one or more PBRs that allow connectivity for voice, video, and data services to and from computing platforms that are outside of the enterprise, also known as edge devices. The applications/services offered by the cloud computing architecture are provided to users of those applications/services. In several instances, there is a requirement to perform traffic inspection of data stored at rest in the cloud computing architecture received from or delivered to those enterprise edge devices. The traffic is often directed through the cloud computing architecture in a manner agnostic to the status of the receiving devices or services. For example, traffic can be directed to a router based on the current PBRs regardless of the status of one or more services, such as a firewall, executed by the router. As noted above, this can lead to the blackholing of traffic.

In order to reduce the probability of the blackholing of traffic, routers may be modified with a service monitoring policy for data plane control, that controls, at the router itself, the manner in which the router operates should the router, or a service offered by the router, become disabled or non-functioning. The SMPDPC allows the router to handle issues specific to the router, issues that may or may not be recognized by the network PBR (NPBR). In some configurations, a local/co-located policy is used to direct traffic towards service instances. However, in the case of a service instances failure, the SMPDPC acts to suppress the incoming traffic from one or more client device, thus reducing the probability of receiving traffic but not being able to direct that traffic because of a service instance failure. Therefore, in some instances, the SMPDPC causes policy-based routing to cease in the affected data plane, taking the affected router out of the forwarding path for traffic in the affected data plane.

For example, a particular firewall may be enabled on a router. The firewall may check the traffic received from a client device intended for an application provided by the network or a service to which the network interfaces through an edge device. The specifics of the firewall may not be known to the network at the time of enabling of the NPBR on the router. Thus, the NPBR may not be sufficient to remediate issues if the firewall on the router were to become nonfunctioning. In this situation, the router may still receive traffic from the network intended for that service but would not be able to direct that traffic because the firewall being nonfunctional prevents the transmission of that traffic.

Rather than allowing the blackholing of traffic, the presently disclosed subject matter enables an SMPDPC between communicating devices. A router has an SMPDPC enabled on the router whereby if one or more service instances provided by the router, such as the firewall example, are nonfunctioning, the data plane between the devices that have established a communication pathway to the router (such as a tunnel) is suppressed using the SMPDPC. As used herein, "enable" or "enabling" means that one or more computer-executable instructions are stored and executed on a device. This suppression effectively removes, or cuts off, the router from a session (such as a bidirectional forwarding detection session) with the transmitting device, and any other transmitting device, for the type of traffic that uses the firewall. In some examples, the router can still continue to receive traffic from those and other transmitting devices that are not affected by the nonfunctioning service (or service instance). In some other examples, the entirety of the traffic intended for the router may be suppressed, such as withdrawing a transporter locator (TLOC) route to the router.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example distributed application architecture that suppresses data plane sessions to redirect traffic, in accordance with some examples of the presently disclosed subject matter.

Generally, the distributed application architecture 102 may include devices houses or located in one or more data centers 104 that may be located at different physical locations. For instance, the distributed application architecture 102 may be supported by networks of devices in a public cloud computing platform, a private/enterprise computing platform, and/or any combination thereof. The one or more data centers 104 may be physical facilities or buildings located across geographic areas that designated to store networked devices that are part of the distributed application architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the distributed application architecture 102 may not be located in explicitly defined data centers 104 but may be located in other locations or buildings.

The distributed application architecture 102 may be accessible to client devices 106 over one or more networks 107, such as the Internet. The distributed application architecture 102, and the networks 107, may each respectively include one or more networks implemented by any viable communication technology, such as wired and/or wireless modalities and/or technologies. The distributed application architecture 102 and networks 107 may each include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The distributed application architecture 102 may include devices, virtual resources, or other nodes that relay packets from one network segment to another by nodes in the computer network.

In some examples, the distributed application architecture 102 may provide, host, or otherwise support one or more application services for client devices 106 to connect to and use. The client devices 106 may comprise any type of device configured to communicate using various communication protocols (e.g., MCTCP, QUIC, and/or any other protocol) over the networks 107. For instance, the client device 106 may comprise personal user device (e.g., desktop computers, laptop computers, phones, tablets, wearable devices, entertainment devices such as televisions, etc.), network devices (e.g., servers, routers, switches, access points, etc.), and/or any other type of computing device.

The application services may be distributed applications such that groups of next-hop devices, or servers 110, are configured to scale up or down to support instances of one or more applications 112 to service client device 106 requests or traffic based on a demand from the client devices 106. As used herein, a "next-hop" device is an adjacent device to which communication is established. For example, in FIG. 1, the servers 110 are next-hop devices to the router 108A. In some examples, the servers 110 may each have their own IP (PIP) address through which they are reachable, but a client device need only know the virtual IP (VIP) address for the servers 110 as a whole in order to access an instance of an application 112 hosted on the servers 110. In this way, client devices 106 need only know a single VIP to access an application service, and the request to use the application service will be routed to one of the applications 112 hosted on one of the servers 110.

In some examples, the distributed application architecture 102 may include router 108A and 108B, which may be routers that route messages based on, for example, equal-cost multi-path (ECMP) routing. For instance, the routers 108 may use ECMP, which is a strategy where next-hop packet forwarding to a single destination can occur over multiple "best paths" which tie for top place in routing metric calculations. Further, any routing strategy may be used by the routers 108, such as Open Shortest Path First (OSPF), Intermediate System to Intermediate System (ISIS), Enhanced Interior Gateway Routing Protocol (EIGRP), and/or Border Gateway Protocol (BGP) in conjunction with ECMP routing.

The router 108A may receive traffic from the client devices 106 using a tunnel 114. The tunnel 114 enables the client devices 106 to connect to one or more resources of the distributed application architecture 102, such as the applications 112. Major tunneling protocols (i.e., Layer 2 Tunneling Protocol (L2TP), Point to Point Tunneling Protocol (PPTP), and Layer 2 Forwarding (L2F)) encapsulate traffic from the client devices 106 and send it across the distributed application architecture 102 to the applications 112. It should be noted, however, that the presently disclosed subject matter is not limited to communication protocols that implement tunneling, as traffic may be received from the client devices 106 at the router 108A using other communication protocols.

In some examples, the distributed application architecture 102 may further include a service instance 116A that provides a router service 118 to the router 108A. In the example described in FIG. 1, the router service 118 is a firewall service that monitors traffic received from the client devices 106 intended for the application 112A. For example, the application 112A may be a web service that provides the users of the client device 106 access to various features and services provided by the application 112A. The router service 118 may be enabled on the service instance 116A to block traffic as required from being routed by the router 108A to the service provided by the application 112A provided by the server 110A. It should be noted that the presently disclosed subject matter is not limited to any particular type of service, as a firewall service is merely an example. Other types of services include, but are not limited to, data loss prevention services, compliance policy systems, load balancers, and intrusion prevention services.

During use, the router 108A can receive traffic 120 from the client devices 106. The traffic 120 is received at the router 108A through the tunnel 114 using the network 107. The router 108A receives the traffic 120 and determines that the traffic 120 is intended for the application 112A provided by the server 110A. The service instance 116A is monitoring the traffic 120 received at the router 108A and enables the router service 118, which in this example is a firewall service. After receiving an acknowledgement from the service instance 116A that the traffic 120 is okay to transmit, the router 108A uses the NPBR to direct the traffic 120 to the server 110A for the application 112A.

However, if the router service 118 or the service instance 116A becomes nonfunctional, the router 108A may not be able to direct traffic to the server 110A, or other servers 110 that may use the same router service 118 for their applications 112. As used herein, "functional" means a service (or application) is being provided by a device and "nonfunctional" means a service (or application) is not being provided by a device. In this instance, in conventional systems, the traffic may be directed and received at the router 108A, but not be directable to a downstream server (i.e., blackholing of traffic). For example, the router service 118 may be nonfunctional at the time the router 108A receives traffic 122 from the client devices 106. Unless the router 108A is provided with an SMPDPC, because the router 108A cannot receive the permission from the router service 118 to direct the traffic 122 due to the router service 118 being nonfunctional, the traffic 122 may be temporarily or permanently stored at the router 108A without being directed to the intended server 110A. However, in FIG. 1, the router 108A is enabled with the SMPDPC. The SMPDPC is a policy that contains instructions specific to the router 108A itself on what to do should the router 108A not be able to perform one or more of the functions of the router 108A. In this example, one of the functions of the router 108A is to enable the router service 118 provided by the service instance 116A to allow the traffic 122 to be directed to the application 112A. Therefore, in some instances, the SMPDPC causes policy-based routing to cease in one or more of the affected data planes.

When the router service 118 becomes nonfunctional, the router 108A accesses the SMPDPC enabled on the router 108A to determine the routing procedure. In some examples, because the router 108A is otherwise functioning except for the ability to receive the router service 118A from the service instance 116A, the router 108A may still be used to route traffic that does not need to receive the router service 118. However, for traffic that does need to receive the router service 118, the router 108A uses the SMPDPC to stop, or suppress, traffic in the data plane (or forwarding plane) session enabled with the client devices 106. Suppression of the traffic in the data plane session enabled with the client devices 106 stops traffic from being directed to the router 108A that need to utilize the router service 118, while still allowing other traffic to continue onto the router 108A. In some examples, all sessions enabled with the router 108A may be disabled, stopping all traffic to the router 108A. Further, other branches (or tunnels) for the data plane session traffic may not be enabled. One or more second data planes established between the router 108A and the client devices 106 for traffic for other applications, such as the applications 112B, 112C, and 112N, may be maintained while suppressing traffic from the client device 106 on the suppressed data plane intended for the next-hop device, such as the server 110A that provides the application 112A that requires the router service 118.

In some examples, the SMPDPC enabled on the router 108A may cause the router 108A to inform the distributed application architecture 102 that the router 108A has suppressed traffic in a particular data plane. The distributed application architecture 102 may thereafter remove the router 108A from the NPBR and enable a router 108B to handle the session traffic suppressed by the router 108A. In some examples, the router 108A may communicate with the router 108B using the SMPDPC to have the router 108B handle the session traffic suppressed by the router 108A with or without being configured to do so by, or with or without the permission of, the distributed application architecture 102. Specifically, the enabling of the router 108B to handle the suppressed session traffic may be directed at the local level by the router 108A. The router 108B may have the router service 118 provided by a service instance 116B, thus allowing the traffic 122 on the data plane intended for the application 112A to continue being forwarded.

In some examples, the session between the router 108A and the service instance 116A may use bidirectional forwarding detection (BFD). As used herein, BFD is a process whereby two devices in communication with each other may detect faults between the two. In the example illustrated in FIG. 1, the router 108A detected a fault with the router service 118. In other examples, faults may be detected and provided to the router 108A using other technologies. The presently disclosed subject matter is not limited to any particular type of fault detection. When the fault is no longer present, the router 108A may access its SMPDPC to determine how to re-able the suppressed data plane session. The router 108A may be reconfigured to receive the suppressed data plane traffic, whereby the router 108B may be reconfigured to have that data plane traffic suppressed, attracting the data plane session traffic to the router 108A.

Figure 2:
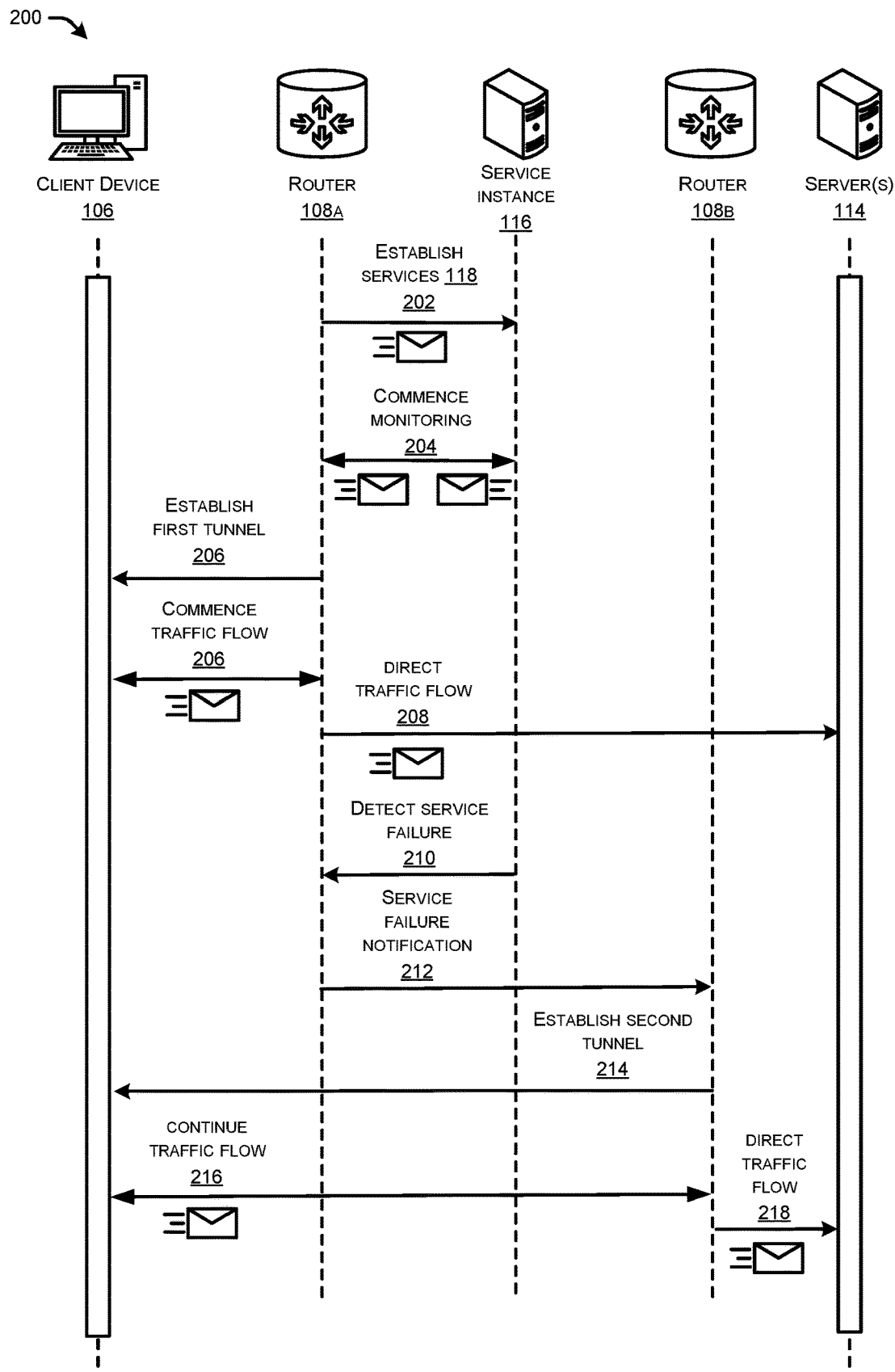
FIG. 2 illustrates a flow diagram of an example communication session between a client device and devices in a distributed application architecture where a router uses local policy-based routing to suppress traffic from the client device and redirect that traffic to another router, in accordance with some examples of the presently disclosed subject matter.

FIG. 2 illustrates a flow diagram 200 of an example communication session between a client device 106 and devices in a distributed application architecture 102 where the router 108A uses SMPDPC to suppress data plane traffic, in accordance with some examples of the presently disclosed subject matter.

At 202, the router 108A establishes services with the service instance 116A. As noted in FIG. 1, the services 118 can include, but are not limited to, firewall services, data loss prevention services, compliance policy systems, load balancers, and intrusion prevention systems.

At 204, the service instance 116A establishes a bidirectional forwarding detection (BFD) session with the router 108A. As noted above, a BFD is a network protocol that is used to detect faults between two forwarding engines connected by a link or a session. Thus, fault detection and mediation can be handled at the local, rather than network, level using technologies such as BFD and SMPDPC.

At 206, a tunnel 114 is established between the client device 106 and the router 108A. The tunnel 114 enables the client devices 106 to connect to one or more resources of the distributed application architecture 102, such as the applications 112. Major tunneling protocols (i.e., Layer 2 Tunneling Protocol (L2TP), Point to Point Tunneling Protocol (PPTP), and Layer 2 Forwarding (L2F)) encapsulate traffic from the client devices 106 and send it across the distributed application architecture 102 to the applications 112. It should be noted, however, that the presently disclosed subject matter is not limited to communication protocols that implement tunneling, as traffic may be received from the client devices 106 at the router 108A using other communication protocols.

At 206, the client device 106 commences traffic flow, whereby the traffic flow is intended for the server 110A. The traffic 122 may be various types of traffic, including, but not limited to, traffic intended for a service provided through the Internet, service requests or communications to servers outside of the distributed application architecture, and the like.

At 208, the traffic flow is directed to the server 110A by the router 108A using an NPBR loaded onto the router 108A. As noted above, the NPBR generally refers to techniques and technology used to make routing decisions in a network. These routing decisions are often established by a network administrator and are used throughout the network. It should be noted that the presently disclosed subject matter is not limited to the use of NPBR, as other routing technologies may be used and are considered to be within the scope of the presently disclosed subject matter.

At 210, using the BFD session between the router 108A and the service instance 116A, the router 108A detects that a service provided by the service instance 116A is nonfunctional. In this example, the nonfunctioning service indicates that the router 108A will not be able to forward the traffic from the device 106A to the server 110A.

At 212, the service instance 116A issues a service failure notification to the router 108A. It should be noted that the router 108A may determine a service failure without the receipt of a service failure notification. The router 108A, using the SMPDPC, acts to move to a state to suppress the data plane BFD session between the router 108A and any devices in communication with the router 108A whose traffic uses the nonfunctional service. Thus, traffic through the tunnel intended for the service provided by the server 110A for the application 112A provided by the server 110A is suppressed and additional communication pathways using the router 108A for the service provided by the server 110A are no longer established.

At 214, a second tunnel is established between a second router 108B and the client device 106. The tunnel 114 enables the client devices 106 to connect to one or more resources of the distributed application architecture 102, such as the applications 112. However, as noted above, the presently disclosed subject matter is not limited to the use of tunnels, as other communication technologies may be used and are considered to be within the scope of the presently disclosed subject matter.

At 216, additional traffic flow is transmitted by the client device 106 to the router 108B using the second tunnel established at 214.

At 218, the traffic flow is directed to the server 110A from the router 108B.

Figure 3:
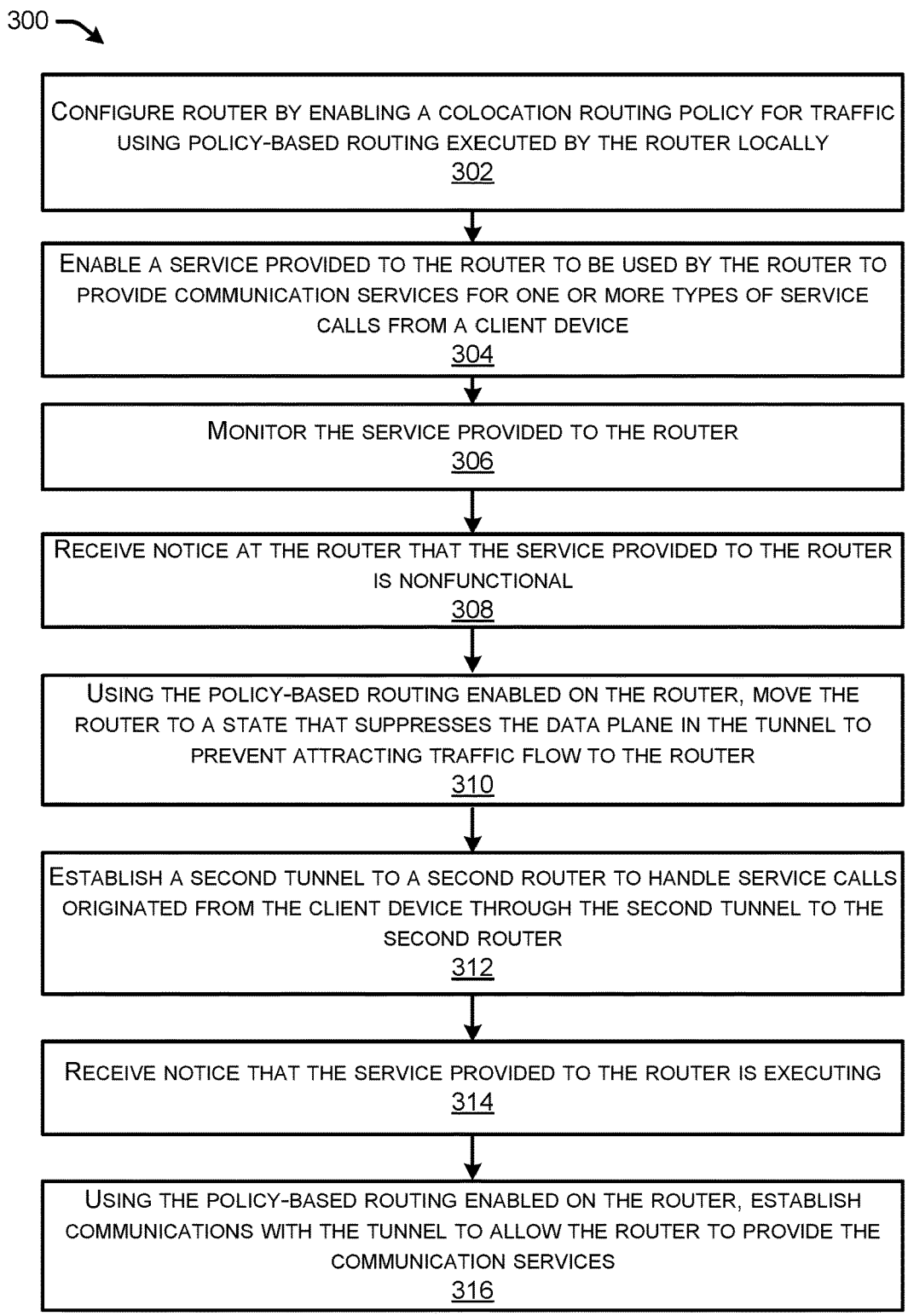
FIG. 3 is a flow diagram of an example method for suppressing data plane sessions to redirect traffic, in accordance with some examples of the presently disclosed subject matter, in accordance with some examples of the presently disclosed subject matter.

FIG. 3 illustrates a flow diagram of an example method 300 that illustrate aspects of the functions performed at least partly by the devices in the distributed application architecture as described in FIGS. 1 and 2. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, or different arrangements of components.

FIG. 3 illustrates a flow diagram of an example method 300 for suppressing data plane sessions to redirect traffic when a router service fails, in accordance with some examples of the presently disclosed subject matter. In some examples, the steps of method 300 may be performed, at least partly, by routers 108A and/or 108B in a distributed application architecture 102. The routers 108A and/or 108B may comprise one or more processors and one or more non-transitory computer-readable media storing computer-executable instructions that, when executed by the one or more processors, cause the one or more processors to perform the operations of method 300.

At 302, the router 108A is configured by enabling a service monitoring policy for data plane control for suppressing traffic, the SMPDPC executed by the router 108A. As described above, various components of the distributed application architecture 102 may have a network-wide, or network policy-based routing, scheme enabled on the devices. In order to provide for the router 108A to handle issues at the router level (rather than at the network level in the distributed application architecture 102), the router 108A is enabled with an SMPDPC.

At 304, a router service 118 is enabled at the router 108A. The router service 118 is used by the router 108A to provide communication services for one or more types of services to a client device 106. The router service 118 can include, but is not limited to, a firewall, data loss prevention services, compliance policy systems, load balancers, and intrusion prevention services. The presently disclosed subject matter is not limited to any particular type of router service 118. In the example illustrated in FIG. 1, the router service 118 is a type of service that, when nonfunctional, prevents the router 108A from being able to forward traffic from the client device 106 to a next-hop device, such as the server 110A.

At 306, the router 108A monitors the router service 118 provided to the router 108A. In some examples, monitoring is enabled through the use of bidirectional forwarding detection (BFD), whereby two devices in communication with each other may detect faults between the two. However, it should be noted that other technologies for detecting faults may be used and are considered to be within the scope of the presently disclosed subject matter.

At 308, the router 108A receives a notice that the router service 118 provided to the router 108A is nonfunctional. The notice may be generated through the BFD or may be generated using other components. As used herein, "nonfunctional" means that the router service 118 is not usable by the router 108A. For example, there may be a communication breakdown between the router 108A and the service instance 116A that prevents the use of the router service 118 by the router 108A. In another example, the service instance 116A may fault and cease execution of the router service 118. The presently disclosed subject matter is not limited to any particular manner in which the router 108A is not able to use the router service 118.

At 310, using the SMPDPC enabled on the router 108A, the router 108A is moved to a state that suppresses the data plane in the tunnel 114 (and other tunnels if so enabled) to prevent attracting traffic flow to the router 108A. The data plane that is suppressed is for traffic received from the client device intended for the next-hop device, such as the application 112A provided by the server 110A. Other data planes may remain enabled for traffic from the client device intended for applications that the router 108A does not use the router service 118 to forward traffic, such as the applications 112B, 112C or the servers 110B and 110N, for example. In this example, traffic that requires the router service 118 may be suppressed, while traffic that does not require the router service 118 may continue to be forwarded by the router 108A.

At 312, using the SMPDPC, a second tunnel is a second router, e.g., 108B, is established to handle service calls (traffic) from the client devices 106 intended for the application 112A provided by the server 110A. Because the router service 118 provided by the service instance 116A is nonfunctional, the router 108B may initiate communication with the service instance 116B to provide the router service 118 for the router 108B. This allows the router 108B to receive traffic from the client devices 106 intended for the application 112A provided by the server 110A.

At 314, the router 108A receives a notice that the router service 118 on the service instance 116A is executing (or functional and able to provide services to the router 108A). The notice may be generated through the BFD or may be generated using other components. As used herein, "functional" means that the router service 118 is usable by the router 108A.

At 316, using the SMPDPC, the router 108A is reconfigured to reestablish the data plane that was previously suppressed by reestablishing bidirectional forwarding detection between the router to commence monitoring of a functionality of the router service by the router, reenabling communications between the router and the client device on the data plane for traffic received from the client device intended for the next-hop device. In some examples, the communications between the router 108B on the previously suppressed data plane is disable between the router 108B and the client devices 106.

Figure 4:
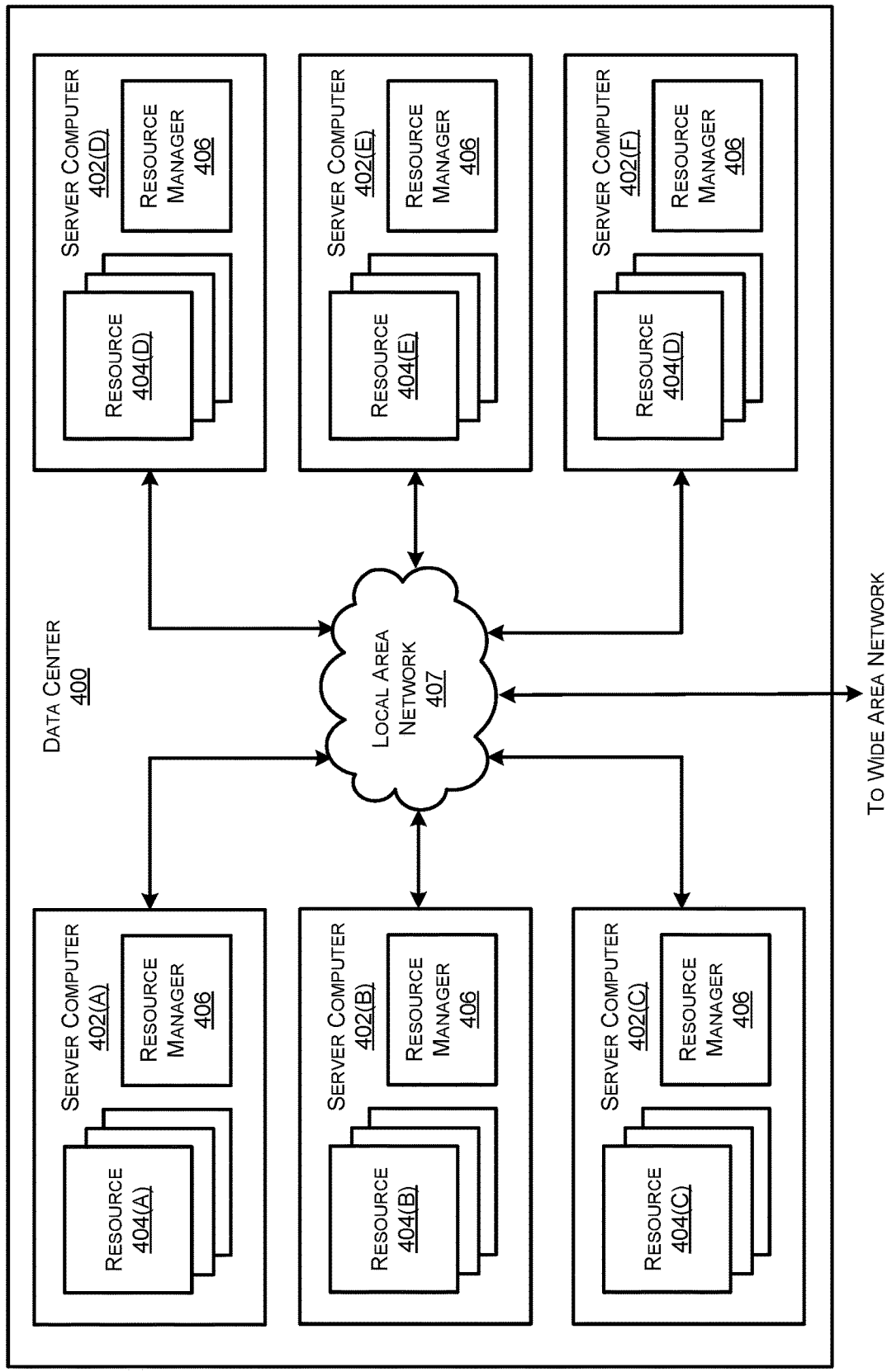
FIG. 4 illustrates a computing system diagram illustrating a configuration for a data center that can be utilized to implement aspects of the technologies disclosed herein, in accordance with some examples of the presently disclosed subject matter.

FIG. 4 is a computing system diagram illustrating a configuration for a data center 400 that can be utilized to implement aspects of the technologies disclosed herein. The example data center 400 shown in FIG. 4 includes several server computers 402A-402F (which might be referred to herein singularly as "a server computer 402" or in the plural as "the server computers 402") for providing computing resources. In some examples, the resources and/or server computers 402 may include, or correspond to, the any type of networked device described herein. Although described as servers, the server computers 402 may comprise any type of networked device, such as servers, switches, routers, hubs, bridges, gateways, modems, repeaters, access points, etc.

The server computers 402 can be standard tower, rack-mount, or blade server computers configured appropriately for providing computing resources. In some examples, the server computers 402 may provide computing resources 404 including data processing resources such as VM instances or hardware computing systems, database clusters, computing clusters, storage clusters, data storage resources, database resources, networking resources, and others. Some of the server computers 402 can also be configured to execute a resource manager 406 capable of instantiating and/or managing the computing resources. In the case of VM instances, for example, the resource manager 406 can be a hypervisor or another type of program configured to enable the execution of multiple VM instances on a single server computer 402. Server computers 402 in the data center 400 can also be configured to provide network services and other types of services.

In the example data center 400 shown in FIG. 4, an appropriate LAN 407 is also utilized to interconnect the server computers 402A-402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 400, between each of the server computers 402A-402F in each data center 400, and, potentially, between computing resources in each of the server computers 402. It should be appreciated that the configuration of the data center 400 described with reference to FIG. 4 is merely illustrative and that other implementations can be utilized.

In some examples, the server computers 402 may each execute one or more application containers and/or virtual machines to perform techniques described herein.

In some instances, the data center 400 may provide computing resources, like application containers, VM instances, and storage, on a permanent or an as-needed basis. Among other types of functionality, the computing resources provided by a cloud computing network may be utilized to implement the various services and techniques described above. The computing resources 404 provided by the cloud computing network can include various types of computing resources, such as data processing resources like application containers and VM instances, data storage resources, networking resources, data communication resources, network services, and the like.

Each type of computing resource 404 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 404 not mentioned specifically herein.

The computing resources 404 provided by a cloud computing network may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations. One illustrative embodiment for a data center 400 that can be utilized to implement the technologies disclosed herein will be described below with regard to FIG. 5.

Figure 5:
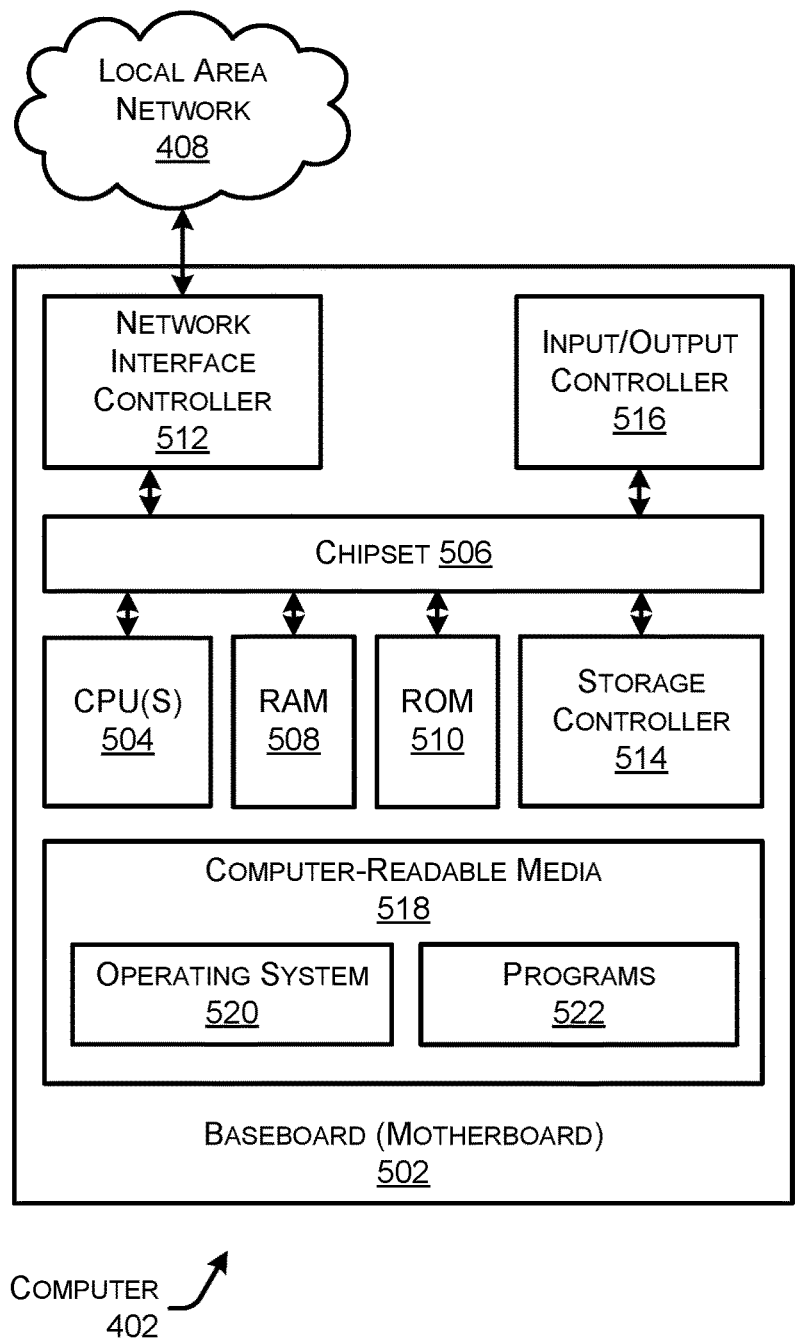
FIG. 5 is a computer architecture diagram showing an illustrative computer hardware architecture for implementing a computing device that can be utilized to implement aspects of the various technologies presented herein, in accordance with some examples of the presently disclosed subject matter.

FIG. 5 shows an example computer architecture for a server computer 402 capable of executing program components for implementing the functionality described above. The computer architecture shown in FIG. 5 illustrates a conventional server computer, workstation, desktop computer, laptop, tablet, network appliance, e-reader, smartphone, or other computing device, and can be utilized to execute any of the software components presented herein. The server computer 402 may, in some examples, correspond to one or more components in the distributed application architecture 102, including, but not limited to server 110, and/or 116A/B described herein, and may comprise networked devices such as servers, switches, routers, hubs, bridges, gateways, modems, repeaters, access points, etc.

The computer 402 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 402.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 402. The chipset 506 can further provide an interface to a computer-readable storage medium such as a read-only memory ("ROM") 510 or non-volatile RAM ("NVRAM") for storing basic routines that help to startup the computer 402 and to transfer information between the various components and devices. The ROM 510 or NVRAM can also store other software components necessary for the operation of the computer 402 in accordance with the configurations described herein.

The computer 402 can operate in a networked environment using logical connections to remote computing devices and computer systems through a network, such as the LAN 407. The chipset 506 can include functionality for providing network connectivity through a NIC 512, such as a gigabit Ethernet adapter. The NIC 512 is capable of connecting the computer 402 to other computing devices over the LAN 407 (and/or 108). It should be appreciated that multiple NICs 512 can be present in the computer 402, connecting the computer to other types of networks and remote computer systems.

The computer 402 can be connected to a storage device 518 that provides non-volatile storage for the computer. The storage device 518 can store an operating system 520, programs 522, and data, which have been described in greater detail herein. The storage device 518 can be connected to the computer 402 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 402 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 402 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 402 can further read information from the storage device 518 by detecting the physical states or characteristics of one or more particular locations within the physical storage units.

In addition to the mass storage device 518 described above, the computer 402 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 402. In some examples, the operations performed by devices in the distributed application architecture 102, and or any components included therein, may be supported by one or more devices similar to computer 402. Stated otherwise, some or all of the operations performed by the distributed application architecture 102, and or any components included therein, may be performed by one or more computer devices 402 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 402. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 402.

In one embodiment, the storage device 518 or other computer-readable storage media is encoded with computer-executable instructions which, when loaded into the computer 402, transform the computer from a general-purpose computing system into a special-purpose computer capable of implementing the embodiments described herein. These computer-executable instructions transform the computer 402 by specifying how the CPUs 504 transition between states, as described above. According to one embodiment, the computer 402 has access to computer-readable storage media storing computer-executable instructions which, when executed by the computer 402, perform the various processes described above with regard to FIGS. 1-4. The computer 402 can also include computer-readable storage media having instructions stored thereupon for performing any of the other computer-implemented operations described herein.

The computer 402 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 402 might not include all of the components shown in FIG. 5, can include other components that are not explicitly shown in FIG. 5, or might utilize an architecture completely different than that shown in FIG. 5.

As described herein, the computer 402 may comprise one or more of a router 108, service instance 116A, and/or server 110. The computer 402 may include one or more hardware processors 504 (processors) configured to execute one or more stored instructions. The processor(s) 504 may comprise one or more cores. Further, the computer 402 may include one or more network interfaces configured to provide communications between the computer 402 and other devices, such as the communications described herein as being performed by the router 108A, the router 108B, the client devices 106, the service instance 116A, and the servers 110. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for providing a distributed application load-balancing architecture 102 that is capable of supporting multipath transport protocol. That is, the computer 402 may comprise any one of the routers 108 and/or servers 110. The programs 522 may comprise any type of program that cause the computer 402 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partly by a router in a distributed application architecture, the method comprising:
enabling a service monitoring policy for data plane control (SMPDPC) on the router, wherein the SMPDPC comprises local policy-based routing instructions stored on the router, wherein the SMPDPC is configured to allow the router to determine if a communication pathway specific to the router is to be suppressed;
enabling, on the router, a router service provided by a service instance, wherein the router service is used by the router prior to forwarding traffic to a next-hop service provided by a next-hop device;
establishing bidirectional forwarding detection between the router and the service instance to commence monitoring of a functionality of the router service by the router;
establishing communications using a data plane session between the router and a client device on a data plane, wherein the data plane is for traffic received from the client device intended for the next-hop device;
receiving an indication that the router service provided by the service instance is nonfunctional; and
suppressing the data plane session, by the router following the SMPDPC stored on the router, to stop traffic originated from the client device and one or more second client devices on the data plane for the traffic originated from the client device and the one or more second client devices intended for the next-hop device.

2. The method of claim 1, wherein the router is a first router and the service instance is a first service instance, further comprising:
enabling, on a second router, the router service using a second service instance; and
establishing communications between the second router and the client device on the data plane, wherein the data plane is for traffic received from the client device intended for the next-hop device.

3. The method of claim 2, further comprising:
receiving an indication that the router service provided by the service instance is functional;
reestablishing bidirectional forwarding detection between the router and the service instance to commence monitoring of a functionality of the router service by the service instance;
reestablishing communications between the router and the client device on the data plane for traffic received from the client device intended for the next-hop device; and
disabling communications between the second router and the client device on the data plane.

4. The method of claim 1, wherein the router service comprises a firewall, a data-loss-prevention service, a compliance-policy system, a load balancer, and an intrusion-prevention service.

5. The method of claim 1, wherein enabling communications between the router and the client device on a data plane comprises establishing a tunnel between the router and the client device.

6. The method of claim 5, wherein the tunnel is a first tunnel, further comprising, upon receiving the indication that the router service provided by the service instance is nonfunctional, ceasing the establishment of a second tunnel between the client device and the router for traffic on the data plane for traffic received from the client device intended for the next-hop device.

7. The method of claim 1, wherein suppressing traffic received from the client device on the data plane for the traffic received from the client device intended for the next-hop device further comprises withdrawing a transporter locator to the router.

8. The method of claim 1, wherein the data plane is a first data plane and the traffic is first traffic, further comprising maintaining a second data plane at the router for second traffic from the client device intended for a second service provided by the next-hop device or a second next-hop device.

9. A server configured to operate in a distributed application architecture, the server comprising:
one or more processors; and
one or more non-transitory computer-readable media storing computer-executable instructions that, when executed by the one or more processors, cause the one or more processors to perform operations comprising:
enabling a service monitoring policy for data plane control (SMPDPC) on the router, wherein the SMPDPC comprises local policy-based routing instructions stored on the router, wherein the SMPDPC is configured to allow the router to determine if a communication pathway specific to the router is to be suppressed;
enabling, on the router, a router service provided by a service instance, wherein the router service is used by the router prior to forwarding traffic to a next-hop service provided by a next-hop device;
establishing bidirectional forwarding detection between the router and the service instance to commence monitoring of a functionality of the router service by the router;
establishing communications using a data plane session between the router and a client device on a data plane, wherein the data plane is for traffic received from the client device intended for the next-hop device;

receiving an indication that the router service provided by the service instance is nonfunctional; and suppressing, by the router following the SMPDPC stored on the router, the data plane session to stop traffic originated from the client device and one or more second client devices on the data plane for the traffic originated from the client device and the one or more second client devices intended for the next-hop device.

10. The server of claim 9, wherein the router is a first router and the service instance is a first service instance, further comprising the operations further comprising:

enabling, on a second router, the router service using a second service instance; and establishing communications between the second router and the client device on the data plane, wherein the data plane is for traffic received from the client device intended for the next-hop device.

11. The server of claim 10, the operations further comprising:

receiving an indication that the router service provided by the service instance is functional;

reestablishing bidirectional forwarding detection between the router and the service instance to commence monitoring of a functionality of the router service by the router;

reestablishing communications between the router and the client device on the data plane for traffic received from the client device intended for the next-hop device; and disabling communications between the second router and the client device on the data plane.

12. The server of claim 9, wherein the router service comprises a firewall, a data-loss-prevention service, a compliance-policy system, a load balancer, and an intrusion-prevention service.

13. The server of claim 9, wherein the operations for enabling communications between the router and the client device on a data plane comprises operations for establishing a tunnel between the router and the client device.

14. The server of claim 13, wherein the tunnel is a first tunnel, the operations further comprising, upon receiving the indication that the router service provided by the service instance is nonfunctional, ceasing the establishment of a second tunnel between the client device and the router for traffic on the data plane for traffic received from the client device intended for the next-hop device.

15. The server of claim 9, wherein the operations for suppressing traffic received from the client device on the data plane for the traffic received from the client device intended for the next-hop device further comprises operations for withdrawing a transporter locator to the router.

16. The server of claim 9, wherein the data plane is a first data plane and the traffic is first traffic, the operations further comprising maintaining a second data plane at the router for second traffic from the client device intended for a second service provided by the next-hop device or a second next-hop device.

17. A router comprising:

one or more processors; and one or more non-transitory computer-readable media storing computer-executable instructions that, when executed by the one or more processors, cause the one or more processors to perform operations comprising:

enabling a service monitoring policy for data plane control (SMPDPC) on the router, wherein the SMPDPC comprises local policy-based routing instructions stored on the router, wherein the SMPDPC is configured to allow the router to determine if a communication pathway specific to the router is to be suppressed;

enabling, on the router, a router service provided by a service instance, wherein the router service is used by the router prior to forwarding traffic to a next-hop service provided by a next-hop device;

establishing bidirectional forwarding detection between the router and the service instance to commence monitoring of a functionality of the router service by the router;

establishing communications using a data plane session between the router and a client device on a data plane, wherein the data plane is for traffic received from the client device intended for the next-hop device;

receiving an indication that the router service provided by the service instance is nonfunctional; and suppressing, by the router following the SMPDPC stored on the router, the data plane session to stop traffic originated from the client device and one or more second client devices on the data plane for the traffic originated from the client device and the one or more second client devices intended for the next-hop device.

18. The router of claim 17, wherein the router is a first router and the service instance is a first service instance, the operations further comprising:

enabling, on a second router, the router service using a second service instance; and establishing communications between the second router and the client device on the data plane, wherein the data plane is for traffic received from the client device intended for the next-hop device;

receiving an indication that the router service provided by the service instance is functional;

reestablishing bidirectional forwarding detection between the router and the service instance to commence monitoring of a functionality of the router service by the router;

reestablishing communications between the router and the client device on the data plane for traffic received from the client device intended for the next-hop device; and disabling communications between the second router and the client device on the data plane.

19. The router of claim 17, wherein the router service comprises a firewall, a data-loss-prevention service, a compliance-policy system, a load balancer, and an intrusion-prevention service.

20. The router of claim 17, wherein the data plane is a first data plane and the traffic is first traffic, the operations further comprising maintaining a second data plane at the router for second traffic from the client device intended for a second service provided by the next-hop device or a second next-hop device.

* * * * *